US009844017B2

(12) United States Patent
Pagonis et al.

(10) Patent No.: US 9,844,017 B2
(45) Date of Patent: *Dec. 12, 2017

(54) METHOD OF ENABLING A WIRELESS INFORMATION DEVICE TO ACCESS LOCATION DATA

(71) Applicant: Conversant Wireless Licensing S.a.r.l., Luxembourg (LU)

(72) Inventors: John Pagonis, London (GB); Mark Jacobs, London (GB)

(73) Assignee: Conversant Wireless Licensing S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,068

(22) Filed: Nov. 9, 2012

(65) Prior Publication Data

US 2013/0070959 A1 Mar. 21, 2013

Related U.S. Application Data

(63) Continuation of application No. 10/515,870, filed as application No. PCT/GB03/02310 on May 27, 2003, now Pat. No. 8,331,952.

(30) Foreign Application Priority Data

May 27, 2002 (GB) .................................. 02121770

(51) Int. Cl.
*H04W 24/00* (2009.01)
*H04W 64/00* (2009.01)
(Continued)

(52) U.S. Cl.
CPC ........... *H04W 64/00* (2013.01); *G01S 5/0072* (2013.01); *G01S 5/0252* (2013.01); *H04W 4/008* (2013.01);
(Continued)

(58) Field of Classification Search
CPC ..... H04W 64/00; H04W 4/023; H04W 4/025; H04W 64/003
(Continued)

(56) References Cited

U.S. PATENT DOCUMENTS 5,267,042 A 11/1993 Tsuchiya et al.
5,604,765 A 2/1997 Bruno et al.
(Continued)

FOREIGN PATENT DOCUMENTS

DE 4437360 4/1996
EP 0440105 8/1991
(Continued)

OTHER PUBLICATIONS

Office Action, dated Aug. 25, 2008, issued in corresponding Japanese Application No. 2004-507280, and English translation thereof (nonsubstantive portions of the translation have been redacted).
(Continued)

*Primary Examiner* — Charles Appiah
*Assistant Examiner* — Jaime Holliday
(74) *Attorney, Agent, or Firm* — Conversant Wireless Licensing

(57) ABSTRACT

A method of enabling a first wireless information device to access absolute location data in which the first wireless information device does not possess its own absolute location finding system but is instead able to receive, over a wireless network, absolute location data from a second wireless information device that does have its own absolute location finding system. The present invention hence enables wireless information devices to share absolute location data: for example, a mobile telephone with GPS capability can be used as a local "beacon" to broadcast its absolute location to any nearby devices over a personal area wireless network (e.g. a Bluetooth network) so that those
(Continued)

nearby devices can use that location data. Hence, a camera with no location finding system of its own could obtain location data from a nearby GPS equipped mobile telephone over a Bluetooth PAN and watermark its images with location data.

8 Claims, 1 Drawing Sheet

(51) Int. Cl.
*G01S 5/00* (2006.01)
*H04W 4/02* (2009.01)
*H04W 4/00* (2009.01)
*G01S 5/02* (2010.01)

(52) U.S. Cl.
CPC .............. *H04W 4/02* (2013.01); *H04W 4/021* (2013.01); *H04W 4/023* (2013.01); *H04W 4/025* (2013.01); *H04W 4/028* (2013.01); *H04W 64/003* (2013.01)

(58) Field of Classification Search
USPC ................ 455/1.2, 41.3, 456.1–456.64, 41.2
See application file for complete search history.

(56) References Cited

U.S. PATENT DOCUMENTS

| | | | |
|---|---|---|---|
| 5,689,809 | A | 11/1997 | Grube et al. |
| 5,805,082 | A | 9/1998 | Hassett |
| 5,938,721 | A | 8/1999 | Dussell et al. |
| 6,023,241 | A | 2/2000 | Clapper |
| 6,138,155 | A | 10/2000 | Davis et al. |
| 6,240,069 | B1 | 5/2001 | Alperovich et al. |
| 6,287,200 | B1 | 9/2001 | Sharma |
| 6,321,092 | B1 | 11/2001 | Fitch et al. |
| 6,340,928 | B1 | 1/2002 | McCurdy |
| 6,542,819 | B1* | 4/2003 | Kovacs .................. G01C 21/28 701/408 |
| 6,553,236 | B1* | 4/2003 | Dunko .................... H04L 63/08 455/456.1 |
| 6,587,835 | B1 | 7/2003 | Treyz et al. |
| 6,768,459 | B2 | 7/2004 | Marinier |
| 6,885,874 | B2 | 4/2005 | Grube et al. |
| 6,888,936 | B1 | 5/2005 | Groen et al. |
| 7,007,074 | B2 | 2/2006 | Radwin |
| 7,092,723 | B2 | 8/2006 | Himmelstein |
| 7,185,085 | B2 | 2/2007 | Bean |
| 2001/0048746 | A1 | 12/2001 | Dooley |
| 2001/0055373 | A1* | 12/2001 | Yamashita ............. H04N 5/232 379/90.01 |
| 2001/0055392 | A1* | 12/2001 | McDonnell et al. ......... 380/258 |
| 2002/0008621 | A1 | 1/2002 | Barritz et al. |
| 2002/0008662 | A1 | 1/2002 | Dooley et al. |
| 2002/0123354 | A1 | 9/2002 | Nowak |
| 2002/0137526 | A1 | 9/2002 | Shinohara |
| 2002/0161547 | A1* | 10/2002 | Fidler ........................... 702/150 |
| 2002/0193121 | A1* | 12/2002 | Nowak et al. ................ 455/456 |
| 2002/0194266 | A1* | 12/2002 | Brebner et al. ............... 709/203 |
| 2003/0040272 | A1* | 2/2003 | Lelievre et al. ............. 455/3.06 |
| 2003/0095032 | A1 | 5/2003 | Hoshino et al. |
| 2003/0157942 | A1 | 8/2003 | Osmo |
| 2003/0233189 | A1 | 12/2003 | Hsiao et al. |
| 2005/0186965 | A1 | 8/2005 | Pagonis et al. |
| 2005/0281237 | A1 | 12/2005 | Heinonen et al. |

FOREIGN PATENT DOCUMENTS

| | | |
|---|---|---|
| JP | 2000-102060 | 4/2000 |
| JP | 2001-042414 | 2/2001 |
| WO | 0148505 | 7/2001 |
| WO | 01/50151 A1 | 12/2001 |

OTHER PUBLICATIONS

Bennett et al., "Piconet:Embedded Mobile Networking", IEEE Personal Communications (Oct. 1997) pp. 8-15.

Harter et al., "A Distributed Location System for the Active Office", IEEE Network (Jan./Feb. 1994) pp. 62-70.

Hooper, "Preparing for the Digital Media Monsoons", ACM Multimedia '98, Bristol, UK (Sep. 1998), pp. 465-474.

Lin, "Personal Location Agents for Communicating Entities (Place)", submitted to the Department of Electrical Engineering and Computer Science, Massachusetts Institute of Technology (May 2002), pp. 1-74.

McCarthy et al., "ACTIVEMAP: A Visualization Tool for Location Awareness to Support Informal Interactions", Handheld and Ubiquitous Computing, vol. 1707 of the series Lecture Notes in Computer Science (Nov. 9, 2001), pp. 158-170.

"MobilePosition, a SignalSoft Company, Launches friendPosition(R) to Swedish Mobile Operator", PR Newswire (Nov. 14, 2001) pp. 1-2.

* cited by examiner

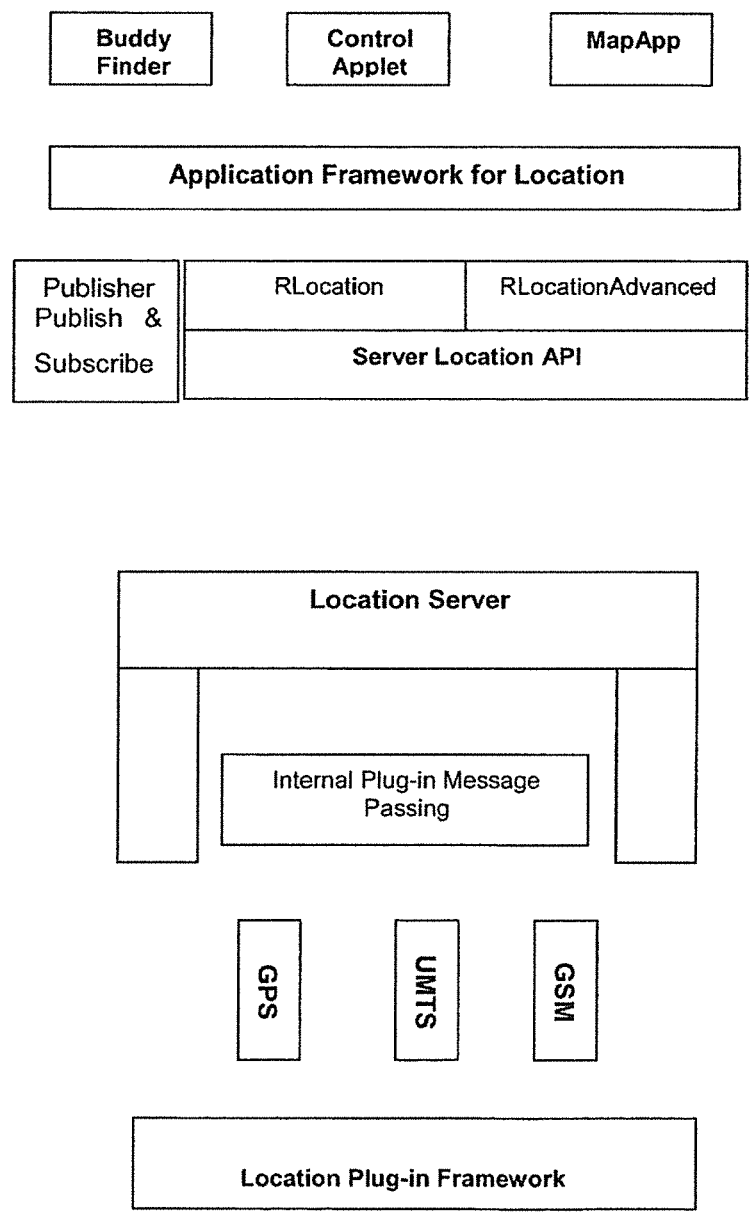

METHOD OF ENABLING A WIRELESS INFORMATION DEVICE TO ACCESS LOCATION DATA

BACKGROUND OF THE INVENTION

1. Field of the Invention

This invention relates to a method of enabling a wireless information device to access location data. The term 'wireless information device' used in this patent specification should be expansively construed to cover any kind of device with one or two way wireless communication capabilities and includes without limitation radio telephones, smart phones, communicators, personal computers, computers and wireless enabled application specific devices such as cameras, video recorders, asset tracking systems etc. It includes devices able to communicate in any manner over any kind of network, such as GSM or UMTS, CDMA and WCDMA mobile radio, Bluetooth, IrDA etc.

2. Description of the Prior Art

As mobile Internet devices and third generation mobile networks become more pervasive, location based services are thought to be a major growth area. Providing information, context and services based on location awareness enables the potential for new capabilities and simplified interfaces for the user, as well as new revenue streams for operators and service providers.

The technology required for provision of automated location information to mobile devices has been in continual development for several decades. Whilst the majority has its roots in military, naval and aviation applications, modern consumer technology is also rising to meet the challenges, specifically in the metropolitan environment. Typical examples of location technology that are being adopted for use in wireless information devices include GPS and basestation triangulation technology that can very accurately measure the time of signal arrival. A device able to determine its absolute location has, conventionally, had to include its own location finding components (e.g. a GPS receiver and related software). These location finding systems are usually regarded as establishing an "absolute location"; this means the physical location in an absolute reference frame, such as WGS-84, as opposed to logical location (e.g. close to a specific location beacon).

Reference may be made to U.S. No. 2001/048746, which shows a mobile telephone with GPS capabilities that is able to share GPS location data with other devices over a short range wireless link; this obviates the need for those other devices to have their own GPS capability.

SUMMARY OF THE PRESENT INVENTION

In a first aspect there is a method of enabling a first wireless information device to access absolute geographic data (i.e. location, speed or direction), in which the first wireless information device docs not possess its own absolute geographic finding system but is instead able to receive, over a wireless network absolute geographic data from a second wireless information device that does have its own absolute geographic finding system; in which the second wireless information device is programmed to enable any authorised component, whether running on the second wireless device or the first wireless information device, to define quality of position parameters and to be sent location data from one or more absolute location finding systems running on the second wireless information device that meet those parameters.

The present invention hence enables wireless information devices to share absolute location data: for example, a mobile telephone with GPS capability can be used as a local 'beacon' so broadcast its absolute location to any nearby devices over a wireless PAN (personal area network, e.g. a Bluetooth network) so that those nearby devices can use that location data. Hence, a camera with no location finding system of its own could obtain location data from a nearby GPS equipped mobile telephone over a Bluetooth PAN and watermark its images with location data.

'Absolute location' In this context means the physical location in an absolute reference frame, such as WGS-84, as opposed to logical location (e.g. close to a specific location beacon).

The second wireless information device could be a simple RF ID tag used in asset tracking whenever the tag is dose enough to a device that is broadcasting absolute location data it stores a second of that absolute location, hence building up a record of its journey.

The second wireless information device does not have to be a portable device, but may be a simple, fixed location beacon programmed with its absolute location. It may also be unable to independently obtain that location, but be simply programmed with it (e.g. may be connected to a WAN and be sent its absolute location over that WAN).

Other kinds of data that accompany location data can also be shared between the first and second devices across the wireless network for example; if the second wireless information device has a GPS receiver, than not only are absolute location co-ordinates generated, but also speed and direction co-ordinates as well. With the present invention, any or all of absolute location, speed and direction (or indeed any other absolute geographic indicator) can be shared between devices. The present invention therefore introduces the concept of 'distributed absolute geographic awareness'—i.e. distributing or sharing absolute geographic data: absolute location, speed in that absolute reference frame used to establish location or direction in that absolute reference frame (and any combination of the three). It hence leverages the ability of just one device to actually obtain and that absolute geographic data, or of one device to obtain one kind of absolute geographic data, and another device to obtain a different kind.

In a second aspect, there is a wireless information device programmed with its own absolute geographic finding system and capable of sharing absolute geographic data with a second wireless information device that does not possess its own absolute geographic finding system but is instead able to receive, over a wireless network, absolute geographic data from the wireless information device; in which the wireless information device is programmed to enable any authorised component, whether running on the device or the second device, to define quality of position parameters and to be sent location data from one or more absolute location finding systems running on the device that meet those parameter.

BRIEF DESCRIPTION OF THE DRAWING

The present invention will be described with reference to accompanying drawing FIG. 1, which shows an architecture for a wireless information device that can implement the present investigation.

DETAILED DESCRIPTION

An implementation of the present invention enables absolute location data sharing between (a) any kind of device that is both cognisant of its absolute location and is capable of transmitting that data location and (b) any kind of wireless device that is capable of receiving that transmitted location data and that might, for whatever reason, benefit from being able to use knowledge of its absolute location. In most practical implementations, the data transmission will be over a transient personal area wireless network, such as a Bluetooth network. Further, most mobile telephones will have some form of absolute location finding capability in the near future and hence make an ideal location beacon for transmitting absolute location data to nearby devices.

To give an indication of the breadth of potential applications of the present invention, the following further examples of use are given:

Use Cases

1. An interesting use case is that of enabling a MP3/Ogg Vorbis digital music playing device to pick up a user's absolute location using the present invention (e.g. from that user's location enabled mobile telephone) and to play a favourite song that reminds the user or connects him to that location. This requires the music playing device to be able to store and update a database with locations and music songs associated with each location.

2. Another simpler idea is that when you take a photo with your camera it embeds a location fix in the postcard which can then be transmitted over the network using Obex that includes a location object in there.

3. Other use cases cover asset tracking and fleet management services where, for example, when a courier delivers a parcel, the signatory effectively watermarks its signature with the location of delivery. For fleet management, a wireless information device could discover (or calculate) it's position from the vehicle's on-board location system.

4. Another use case is that of location-relaying where many devices in a "wireless-chain", relay the location fix obtained from an other. In that scenario, only one such device can obtain the absolute location fix (from GPS or Galileo satellites for example) and the others relay it; so that for example in a building many devices get to know about their location together with an error which can be calculated from the number of hops. In that scenario, triangulation is also possible using multiple sources.

5. An interesting use case is that of asset tracking with restricted operational range. For example if a laptop should not leave a predefined area/premises etc. Then it can be programmed to seek such location beacons and completely lock or destruct (automatically or after communication to base) if such location identification is made. The value there of that laptop (or other device for that matter) not to have it's own location system is that it can pick up location beacons from many other device and after authentication (or not) make the appropriate decisions and actions.

6. As noted earlier, it is possible to share non-location data as well. For example, an on-car GPS navigation system could share speed data with to an on-car data recorder, that would alert the user if it's speed was excessive. The on-car data recorder could use location information from the GPS system to establish the road the car was travelling on (for example, in conjunction with conventional GPS navigation software, such as the TomTom Navigator) and, using a database of applicable speed limits for all roads, establish if the car is speeding or not. The GPS navigation system could also share location data with an on-car road charging system: the congestion charging system can work out if the car's location corresponds to a charge area (e.g. toll road, congestion area) and then ensure that the appropriate debit or charge or payment is made.

The method used to share absolute location data is relatively straightforward. For example, one way to distribute absolute location information to the personal area network over Bluetooth is to have devices inquiring the location-aware device's, SDP (service discovery protocol) records—using a universally unique identifier (UUID)—for the particular service that provides the location information. In fact, the location-aware device can make this process much simpler and faster by including the location fix in it's SDP service records and thus returning the result to the interested parties embedded in the SDP response (as opposed to returning the relevant info for the remote device to connect to the location service).

Another way (which would require more battery power) would be for a Bluetooth device to periodically broadcast/multicast such location fixes using raw Bluetooth Link Layer AUX packets and thus allow anyone who might listen to pick them up.

A standardised location data format, akin to the vCard format for personal contact information, would be possible.

Currently, applications that need location information are tightly bound into the technology that provides the location data. This may require developers to understand in detail how GPS and GSM triangulation location technologies operate, which is onerous. The present invention can be implemented using a location technology "insulation layer" in the second wireless information device OS which separates and hence decouples applications and any system servers from the underlying location technologies. Hence, location technologies (e.g. a GPS plug-in or a GSM triangulation plug-in) provide location data to the insulation layer (a server in a Symbian OS implementation). This server insulation layer then gives access to the location data to any client (e.g. an application or system server) that needs it over a generic API. Critically, the client need not be limited to a client on the second wireless information device itself, but can reside on a completely different device that does not have its own location finding system.

There are further advantages to a location insulation layer approach:

Application developers can develop location based apps without needing to understand the specifics of any location technology such as GPS or even define the kind of location technology that should be providing the location data; they merely need to be able to use the API.

Location technology developers can develop location technology without needing to understand the specifics of any application or system server; the location technology can be implemented as plug-ins, which are potentially hot swappable;

Any application or resource on the device that needs location data can now readily obtain it; location data is made available across the entire OS.

Multiple location technologies could be running on one device, with the insulation layer deciding which technology to use at any time—the application need know nothing about a hot-swap over between technologies;

The location information can be readily supplied to different system servers—e.g. a system server which decided which bearer/protocol to communicate over could be fed location information and use that as part of its decision making; hence, when within range of a Bluetooth pod, it could change to Bluetooth; when out of range, it could revert to GSM etc.

A device can be readily made to dial out its location information (e.g. to the police) if the device receives an appropriate trigger message that the device is stolen.

A publish and subscribe API can be used to enable any such authorised server, whether running on the second wireless information device or the first wireless information device, to subscribe to location data published by any of the location finding systems running on the second wireless information device

APPENDIX 1

Appendix 1 comprises a more detailed description of a suitable architecture, plus a discussion of some important design principles for a location aware operating system.

1. Source Data Processing

The location aware device can use one or more different location sensing technologies; where more than one is used, a technique for combining location data from multiple sources into a single estimate of location may be employed. This is particularly useful where the different sources have differing characteristics, in terms of acquisition technique and accuracy. The aim of such processing is to improve the new accuracy of a location fix, above that of any individual source.

Kalman filtering is often used to combine, GPS and INS data, as the strengths of each compensate the weaknesses of the other very well, resulting in output data of higher accuracy than anyone of them can provide at any given instant in time.

2. Security, Privacy

Security of location information is based around "Who", "Where", and "When". These are listed in order of importance for protection. The location aware device should guard the most securely whom it represents. "Where" that person is can reasonably be shared with others also in the locality (although arguably so long as the "who" is not shared) as explained above, and time can be shared with anyone (restricting the other two).

However, as this information is the most dangerous when more than one is known (in particular, all three, and for a range of times), securing all three, from leakage to remote parties, is the most sure-fire way of avoiding this most sensitive combination falling into the wrong hands. So each of the three should only issued on a "need to know" basis—providing open services in a personal device should only be done on the explicit instruction of the user.

3. Location Discovery vs. Navigation

Another way of partitioning services is between location discovery (static), and navigating through space (dynamic). A third class is the intersection of these two (continuously discovering whilst moving).

Discovery covers many areas, such as

1. Own location ("where am I?")
2. Other location ("Where am I going?")
3. Person location ("Buddy finder")
4. Information filtering ("present traffic info before going out of home on Monday morning")
5. action/event filtering ('don't beep loudly when in the cinema or boss' office')
6. Service location ("Find my nearest . . . ")
7. Other property of a location (local time-zone, traffic conditions, weather, etc.)

The last two are to many degrees interchangeable, as you can view a local service as a property of a location, and a service may itself provide other information (properties) about that location.

4. Location Awareness: Architecture Considerations

App Engines

Location knowledge is primarily an application service, although it is important to appreciate that the applications that use the location data can be distributed across several devices, connected over a wireless PAN.

Contacts and Agenda applications can benefit greatly from location data, and there is also potential for journaling. Location based searching for local as well as remote content is facilitated. One could imagine a "location" stamp anywhere there is currently a "time" stamp—e.g. on documents (e.g. to establish where electronically signed; on photographs for evidential reasons, with the location data being watermarked to be tamper evident). One might also want to log symbolic location information, or to tie this info into contacts, e.g. My Contacts & My Locations, for commonly used locations.

A "World" mapping application could get auto updates from location. It actually re-publishes some of the information that may be available from a location server, e.g. time zone and local dialling code. If these were standardised into location server, the 'World' app server could just relay them through (or perhaps disappear altogether).

5. Power Management—Polling Concerns

Initial usage models will generally assume that location information is only sought through direct user intervention. This solves many security and power consumption issues. This has the downside, however, that the time to first fix (ITFF) could be quite high, as when the user initiates location acquisition activity, the device must bootstrap it's knowledge from nothing. If any future hardware supports a "tell me when I move (more than X meters)" notification interface, then the TTFN could be reduced significantly. This is based on the assumption the user moves (more than X meters) fairly infrequently in terms of device on time. For network based location technologies, this could greatly reduce battery drain for autonomous applications.

6. Architecture—Component Level View

To better understand the architecture, we present a component view based on areas of responsibility.

The philosophy behind the suggested APIs and Architecture for Symbian Location Awareness/LBS is:

"make it easy for most and possible for the others"

Thus, we have the distinction between the different offered APIs and the separation of plug-ins from the plug-in framework. The overall structure is shown in the attached figure. The main components are described in the following section.

6.1 Location API

Responsibilities:

Present a clean and simple interface by which most clients can use the location primitives offered by the context server. Such an API will provide the Location primitives to the upper layers of the platform like applications, application engines and application protocols.

Offer services to obtain location fixes based on various QoS parameters requested by its client and present the data in a simple and consistent format (most likely WGS-84 and possibly Cell-ID strings).

Clients:

Applications and the application frameworks

Collaborations:

With the Context Server 6.2 Advanced Location Client API

Responsibilities:

Present a complete and generic interface by which clients can request a variable number of attributes from the Context server and thus make use of any capabilities that a particular location technology may have to offer. Also allows for bi-directional data transfer.

Clients:
Advanced and/or technology dependent applications and the app framework.
Collaborations:
With the Context Server
6.3 Location Awareness Server
Responsibilities:
To encapsulate and mediate resource sharing of the location acquisition resources/technologies. The server is responsible for routing client calls to the correct technology plug-in, based on the caller's QOS requirements, as well as police the interaction based on the platform security model.

It hosts the location acquisition technology plug-ins and provides the framework needed to interface them.

Enforces per transaction policing efficiently so that on every call from the client it checks every process' capabilities mask.

Clients:
The Location Clients
Collaborations:
With the location acquisition technology plug-ins.
Publish and Subscribe interface in the Kernel.
File Server, DBMS Server
ESock and whatever resources and servers that the technology plugins may need.
6.4 Plug-ins Framework Responsibilities:
To enable and facilitate re-use among plug-ins and facilitate plug-in development.
Clients:
Plug-ins and the Context Server
Collaborations:
Base components
6.5 Plug-in Message Passing Framework
Responsibilities:
Allow different location acquisition plug-ins to intercept and exchange messages so that we can have plug-in functionality reuse with loose coupling (e.g. AGPS using GPS) and for a listen/hook interface in order to log all events if a product wants it; or for fusion scenarios where one plug-in may provide location fixes by combining other technologies.
Clients:
Plug-ins and the Location Server
Collaborations:
Location Server
Base components
other plug-ins
6.6 Quality of Position Services
Responsibilities:
Select a positioning technology which fulfils the QoP parameters provided by a client through the Location Client API. Allow the client to obtain location fixes without specifying a particular location acquisition technology plug-in. Basic set of QoP parameters shall include: horizontal accuracy, vertical accuracy, time to fix, cost, power consumption.
Clients:
Plug-ins and the Location Client API
Collaborations:
Location Server
Location acquisition technology plug-ins.
6.7 Location Acquisition Technology Plug-ins
Responsibilities:
To interface with the location acquisition technologies and the Location Server. Each plug-in is responsible for providing the communication mechanisms and protocols needed to interface with a particular technology and hardware.

Plug-ins are also concerned with providing static technology specific capabilities, as well as runtime capabilities (e.g. no GPS signal etc) to the server necessary for the location QoS decision making in the server.

The cost option of a plug-in is provided by the operator/user not the plug-in itself as it may change according to operator, time, subscription and possibly even location (roaming etc).

Clients:
Location Server and other plug-ins indirectly
Collaborations:
Context server other plug-ins through the framework
ETel (SMS,GSM/GPRS,UMTS)
C32 server, UART/some serial or bus abstraction drivers etc.
6.8 Application Framework
Responsibilities:
Conversion of map data
Interfacing to DBMS (e.g. Landmarks DB, persistence, log viewing)
Privacy related settings and service filtering.
Clients:
Apps and other frameworks.
Collaborations:
Between Location Server app engines and GUI
7. Client API Recommendations
Location Acquisition Technology Modularity Architecture In the internal architecture underlying the Location Server the vision is to allow for technology specific server plug-ins to act as the hardware proxies for the location acquisition hardware, utilising their full capabilities.

For these reasons and because a varying plethora of such hardware is expected to be used by licensees and users, the interface between the server and these plug-in will allow for 'load time' capabilities discovery. In effect a plug-in will present as many published interfaces as it needs.

This can be achieved by making use of a simple capabilities discovery protocol and polymorphic factory managed plug-in dlls.

Using this scheme will also allow applications and $3^{rd}$ parties to make use of specific hardware capabilities without needing to extend the server or plug-in interfaces.

As a minimum we believe that the technology plug-ins may expose interfaces like:
NMEA 0183 v2.0 or some subset of
Power Management
Cell-ID
Basic Lon,Lat,Alt
Basic Anchor, waypoint operations
QoS Capabilities Advertisement Internally to the technology plug-in modules, developers may choose any number of methods to communicate with the hardware. For example to harness all of the device's potential one developer may choose use the proprietary device specific protocols (to communicate with the device) whereas other may decide for time-to-market reasons to use simpler means (like NMEA for GPS receivers). In any case the interfaces exposed will insulate from the internals that may change in later revisions of these modules.

In the case of a $3^{rd}$ party harnessing the full potential of an advanced GPS device, they would communicate using the receiver's proprietary protocol and translate raw data to NMEA sentences as needed if exposing an NMEA interface.

At the same time all modules will be expected to use the 'Location QoS Capabilities' interface to register their static and run-time capabilities with the server (which does not preclude them being stored in a DB). This registration allows the Location Server to dynamically select technology plug-ins to satisfy client requests with particular QoS requirements.

7. Plug-in Settings

Installed Location Server plug-in modules will need a level of configurability that will demand some settings to be stored and retrieved on persistent storage. Configuration of these settings will be exposed to the user by means of control applets.

To achieve a secure and caged access to these settings, they will most likely (unless a P&S mechanism is chosen) be stored and structured in a database, hosted by the DBMS Server.

A framework for the plug-ins will be provided to access these settings on the DBMS server through the Location Server.

What is claimed is:

1. An apparatus, comprising:
    at least one processor, wherein the at least one processor is programmed to cause the apparatus to at least:
        select an absolute location finding system, from a plurality of absolute location finding systems running on the apparatus, that meets quality of position (QoP) parameters defined by an authorized component running on the apparatus; and
        in response to selecting the absolute location finding system that meets the defined quality of position parameters and in response to an inquiry, cause location data from the selected absolute location finding system to be sent to a device different from the apparatus over a Bluetooth network using a universally unique identifier (UUID) for a location information service;
        wherein the QoP parameters are selected from at least one of: horizontal accuracy, vertical accuracy, time to fix, cost and power consumption.

2. The apparatus of claim 1, wherein the different device is a wireless device;
    and wherein the at least one processor is further programmed to cause the apparatus to receive a request for location context data from the wireless device, and to send the location context data to the wireless device.

3. The apparatus of claim 2, wherein the at least one processor is further programmed to cause the apparatus to determine the location data of the apparatus and the location context data associated with the location data.

4. The apparatus of claim 2, wherein the location context data comprises travel speed data, time-zone data, at least one traffic condition or a combination thereof.

5. A method, comprising:
    at a first device, selecting an absolute location finding system, from a plurality of absolute location finding systems running on the first device, that meets quality of position (QoP) parameters defined by an authorized component running on the first device; and
    in response to selecting the absolute location finding a system that meets the defined quality of position parameters and in response to an inquiry, sending location data from the selected absolute location finding system to a second device over a Bluetooth network using a universally unique identifier (UUID) for a location information service;
    wherein the QoP parameters are selected from at least one of: horizontal accuracy, vertical accuracy, time to fix, cost and power consumption.

6. The method of claim 5, wherein the second device is a wireless device;
    and further comprising:
        receiving a request for location context data from the wireless device, and
        sending the location context data to the wireless device.

7. The method of claim 6, further comprising determining the location data of the first device and the location context data associated with the location data.

8. The method of claim 6, wherein the location context data comprises travel speed data, time-zone data, at least one traffic condition or a combination thereof.

* * * * *